(12) United States Patent
Matula et al.

(10) Patent No.: US 11,303,848 B2
(45) Date of Patent: Apr. 12, 2022

(54) ENHANCE PRIVACY OF PARTICIPANT IN VIDEO CONFERENCING

(71) Applicant: Avaya Management L.P., Santa Clara, CA (US)

(72) Inventors: Valentine C. Matula, Granville, OH (US); Sandesh Chopdekar, Pune (IN); Pushkar Yashavant Deole, Pune (IN); Navin Daga, Silapathar (IN)

(73) Assignee: Avaya Management L.P., Santa Clara, CA (US)

( * ) Notice: Subject to any disclaimer, the term of this patent is extended or adjusted under 35 U.S.C. 154(b) by 0 days.

(21) Appl. No.: 16/894,226

(22) Filed: Jun. 5, 2020

(65) Prior Publication Data
US 2021/0385412 A1    Dec. 9, 2021

(51) Int. Cl.
     *H04N 7/15*      (2006.01)
     *G06K 9/00*      (2006.01)

(52) U.S. Cl.
     CPC ........... *H04N 7/15* (2013.01); *G06K 9/00711* (2013.01)

(58) Field of Classification Search
CPC combination set(s) only.
See application file for complete search history.

(56) References Cited

U.S. PATENT DOCUMENTS

| | | | |
|---|---|---|---|
| 8,233,028 B2 | 7/2012 | Erhart et al. | |
| 2008/0136895 A1* | 6/2008 | Mareachen | H04N 7/147 348/14.03 |
| 2012/0060095 A1* | 3/2012 | Klappert | H04N 21/458 715/722 |
| 2017/0185808 A1* | 6/2017 | Zhang | G06F 21/6245 |
| 2018/0188939 A1* | 7/2018 | Alexander | G06F 3/04845 |
| 2020/0074156 A1* | 3/2020 | Janumpally | G06K 9/00255 |
| 2020/0388030 A1* | 12/2020 | Steelberg | G06K 9/00228 |

* cited by examiner

*Primary Examiner* — Phung-Hoang J Nguyen
(74) *Attorney, Agent, or Firm* — Sheridan Ross P.C.

(57) ABSTRACT

A live video stream, such as one provided by a participant of a video conference, may comprise images of private information that the participant does not wish to provide. Object images captured by a camera are detected and inventoried along with descriptors of the object image. The descriptors are compared to private image identifiers, which define image attributes and/or categories of images. If a match occurs between at least one descriptor and at least one private image identifier, the object image is considered private and a substitute image is provided in place of the object image in a processed video image. The processed video image is then provided to the video conference. Additionally, conference profiles may categorize objects considered private for a particular type of video conference (e.g., work, friends, family, etc.).

20 Claims, 10 Drawing Sheets

ENHANCE PRIVACY OF PARTICIPANT IN VIDEO CONFERENCING

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for privacy control and particularly to the automatic detection and exclusion of private image data from a video stream.

BACKGROUND

Video conferencing (e.g., video chat, video meetings, etc.) has become common today. However, video introduces another dimension of privacy challenges for video conference participants. Other participants may inadvertently view background or details about the participant or surroundings, which could be embarrassing or result in a breach of confidentiality.

Privacy and confidentiality of the participants and their surroundings need to be protected during video conferences. The confidentiality extends to the participant and their surroundings, such as their personal surroundings when video conferencing from home or professional surroundings when video conferencing from work. While maintaining the confidentiality of legally protected information (e.g., trade secrets, personnel information, financial information, etc.) is of obvious importance. Other information, if revealed, could be damaging to a reputation or business relationship. For example, a customer service agent providing support for one company may have a competitor company's product visible in the video image.

SUMMARY

The embodiments disclosed herein are generally directed to the automatic detection and prevention of privacy breaches in a video communication. More specifically, a video image is captured by a camera for transmission to another party, such as may occur during a video conference. The video portion, as captured, comprises a first portion intended to be seen by a party viewing a video conference. The video may also compromise at least one second portion having private or confidential content captured by the camera but not intended to be seen by the party viewing the video conference. As will be described more completely with respect to the embodiments herein, the presence of such private or confidential information is automatically detected and prevented from being transmitted to the other party. For example, once detected, the at least one second portion may be obscured, overlaid, or otherwise altered to prevent the private or confidential information, captured by the camera, from being included in the video image transmitted to the other party.

The embodiments herein provide solutions to enhance privacy of a participant, and the participant's setting, during a video conference (e.g., video chat, video communication) depending upon the user's privacy profile and/or privacy preferences.

The proliferation of affordable video conferencing solutions, video conferencing is commonplace for both personal and business use. Video conferencing can be an invaluable tool when members of a team are in different geographical locations or otherwise find in-person meetings impossible or impractical. However, when video of a person is shared, unintended visuals of the person and their surroundings may be transmitted. This may particularly effect people who are using video conferencing to conduct meetings while working from home, where a workspace utilized for video conferencing cannot be dedicated solely to work. However, even when conducted in an office setting or when the video is used for personal communications, visuals that constitutes private or confidential information may chance, but may still be present.

There are limitless examples of what visuals may be considered private or confidential in various video communications, which may depend on the participant, the purpose, personal preferences, or other similar factors. Examples may include a specific time, such as when a work meeting is early in the morning or without sufficient notice and may not be properly groomed and the facial features or attire of the participant are not proper for a professional meeting. While working from home, there can be several issues, such as the attire or background captured may not be appropriate for viewing during a work meeting. Additionally or alternatively, the actions of the participant may create issues, such as if in the course a meeting, the participant has to get up, and move away from camera. In such a case, it might not be desirable to maintain a live image of the, now absent, participant. Even while working from within an office setting, the participant may take a video call and have colleagues, documents, other computer displays or other content that may be undesirable either in general or for a particular video call with a particular participant.

In one embodiment, a video conferencing solution is provided to automatically identify scenarios that comprise images or image portions that are considered private (e.g., confidential, protected, etc.) and block the camera and/or change the visuals (e.g., the user, surroundings, background). The images or classifications of what constitutes the private images and/or the changes applied to the visuals may be customized by an administrator and/or the participant. As a result, even if a user is unaware of a privacy issue or forgets to explicitly turn off the camera, the system, would detect such scenarios and take action to protect the images of the private information from being transmitted to the other participant(s). The actions may include termination of the video sharing (e.g., turning off the camera, termination of the video stream provided from the device utilized for the conference, etc.) and/or the modification of the visuals imaging the private information that form a portion of the video image being sent to other participants.

In another embodiment, one or more privacy profiles may be created and utilized. For example, a user may create a privacy profile for office meetings, family meetings, friends' meetings. Additional profiles may be created for specific needs (e.g., office meetings with specific individuals, office meetings with specific customers, etc.). The privacy profiles can have varying levels and/or subject matter determined to be private. For example, an office or business profile may have the highest level of privacy, friends profile having moderate level of privacy and family profile having low level of privacy.

In another embodiment, privacy profiles may be customized and configured. For example, if the user is not properly groomed, say the user is unshaved, has stubble, then in that case, do not turn on camera, or use an overlay to modify the visual element of the user's face. If the user is in the middle of the meeting and moves away from the camera, the system can be configured to shut off camera or terminate the video feed. If the system detects the user is not wearing appropriate attire for the meeting, the system will detect and warn the user at startup. If the warning is not heeded, the system may disable automatic startup of the camera and/or require the user to manually turn on the camera. Other modifications to the visuals may be provided. For example, if the conference is early morning or the user did not get sufficient sleep, the user may be continuously yawning. The system determines from the facial features that the user is not very energetic and, in response, turns off the camera. Alternatively or additionally, a user can configure a profile so that only the face of the user can be seen by the other participants. The reminder of the user's body is then hidden or overlaid. If the system detects that the user's background/surroundings are not appropriate to be shared, the system can focus on the user to blur the surroundings/background.

In another embodiment, the system analyzes the video image for content, such as in the background, and modifies the video image based on identification of a specific item or category of items. The system will scan the user and surroundings before, or just after, the user joins the conference, so that appropriate action can be taken. The system may then prompt the user, such as with a pop-up, with the suggested privacy profile at the start or during the meeting and provide the opportunity for the user to make changes to the privacy settings or keep the current profile. Later, the system continuously keeps on monitoring the visuals for any changes and the audio of the meeting for any intent, which can be corrected in future by substituting the visuals. For example, if during a business video meeting with the user working from home, someone may come to the user's door requiring the user's attention.

With a privacy profile configured to discontinue the video when the user is not seated or the upper torso is not visible, the video would be terminated when the user gets up from chair, or the upper torso, moves out of the camera.

In another embodiment, the audio portion (sound or transcription) of a prior meeting may be analyzed or imported for content applicable to a future meeting. For example, if during a first meeting, an analysis of a transcription discovers the that a client asked if the user has created any intellectual property. A database or other record is accessed and determined that a visual element is associated with "intellectual property." As a result, subsequent video meetings with the client may overlay an image of a patent award into the background.

In another embodiment, a system, comprising at least one processor, may comprise or utilize a conferencing system utilized for video communications, identifies the profile to be used for the video meeting. Then visuals are identified and, in accordance with the profile, an associated action is taken to provide the desired level of privacy.

Step 1: Identify the privacy profile to be used for the meeting. The system will have a privacy profile manager, which will allow the user to create privacy profile(s), using a combination of the various privacy options. The system may also provide templates and/or default settings for various profiles, like business, friends, families, social meetings, etc. The profile can be configured to provide more granular settings and/or modifications or exceptions to rules utilized to determine what is and is not considered private.

The system may identify a video conference and apply a default setting. For example, based on a meeting title, participants, participant attributes, contact list entry, email domain, phone number, etc., a meeting may be determined to be work, family, friends, or other designation. In response, the associated privacy profile selected and applied. If a prior meeting utilized a particular privacy profile and the same or similar participants are invited to an upcoming video meeting, the prior privacy profile may be utilized for the upcoming meeting. In another embodiment, machine learning or artificial intelligence may be utilized to determine past trends as they apply to a current scenario and automatically implement or prompt the user to accept suggested settings.

Step 2: The system identifies the visuals in the image and take appropriate actions as per the identity of the visual or category of the visual associated with the privacy profile.

Identification of the visuals is variously embodied and includes, but is not limited to, pattern matching with stored images, textual analysis (e.g., titles visible on books, posters, documents, etc.) and graphical libraries utilized by artificial intelligent (AI) or machine learning (ML) systems. Accordingly, objects and persons (e.g., the participant and/or other people) may be identified and, in accordance with the privacy profile utilized, obscured or otherwise prevented from being provided to the conferencing system. For people, in particular the participant, a facial expression may be determined and, altered if necessary, such as via a dynamic overlay. Additionally, detection of body parts and their motion (e.g., leaving the camera's field of view, yawning, etc. may be detected.

To obscure images of background objects, overlays may be provided and/or focal area of the camera narrowed, such that the participant is in focus while the background is blurred. For other objects, including the participant, video stitching may be utilized to provide an overlay or modification of the visuals. For example, to appear clean shaven and alert, when the participant just woke up. Clothing may be altered, such as to present the user, currently in a t-shirt, as wearing a suit. This may be accomplished by taking image samples when the user is actually wearing a suit and digitally fitting it over the image of the user. Similarly, visuals of the user speaking, and in various facial expressions, while speaking/not speaking, may be captured and applied to the visuals of the actual user. Additionally or alternatively, color and/or texture may be applied to a user's clothing as either the overlay to the visual itself or as an alteration to the visual, such as to give a clothing overlay variety. The overlays may extend to the participant themselves, such that only a face may be captured and presented to the video conference and the remainder of the participant's body generated or provided from other sources as an overlay.

These and other needs are addressed by the various embodiments and configurations of the present invention. The present invention can provide a number of advantages depending on the particular configuration. These and other advantages will be apparent from the disclosure of the invention(s) contained herein.

In one embodiment, a method for automatically preventing a portion of a video image containing private information from being included in a video communication, is disclosed comprising: obtaining, by a processor, a set of private image identifiers; obtaining, by the processor, an unprocessed video image captured by a camera; generating, by the processor, an image inventory comprising at least an object image captured in the unprocessed video image; obtaining, by the processor, a descriptor of the object image; upon determining the descriptor of the object image matches at least one of the set of private image identifiers, setting a private attribute associated with the object image; generating, by the processor, a processed video image comprising the unprocessed video image and excludes a portion of the unprocessed video image that comprises the object image, when the private attribute is set, and providing the processed video image to a network interface for transmission, via a network, as a portion of the video communication.

In one embodiment, a system for automatically preventing a portion of a video image containing private information from being included in a video communication is disclosed, comprising: a system; a processor; a camera; a memory; a network interface to a network; and wherein the processor, coupled to the memory programmed with machine-executable instructions, cause the processor to: obtain a set of private image identifiers; obtain an unprocessed video image captured by the camera; generating an image inventory comprising at least an object image captured in the unprocessed video image; obtain a descriptor of the object image; upon determining the descriptor of the object image matches at least one of the set of private access identifiers, set a private attribute associated with the object image; and generate a processed video image comprising the unprocessed video image that excludes a portion of the unprocessed video image that comprises the object image, when the private attribute is set, and providing the processed video image to the network interface for transmission, via the network, as a portion of the video communication.

In another embodiment, a system for automatically preventing a portion of a video image containing private information from being included in a video communication is disclosed comprising: means to obtain a set of private image identifiers; means to obtain an unprocessed video image captured by the camera; means to generating an image inventory comprising at least an object image captured in the unprocessed video image; means to obtain a descriptor of the object image; upon determining the descriptor of the object image matches at least one of the set of private image identifiers, means to set a private attribute associated with the object image; and means to generate a processed video image comprising the unprocessed video image that excludes a portion of the unprocessed video image that comprises the object image, when the private attribute is set, and providing the processed video image to the network interface for transmission, via the network, as a portion of the video communication.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
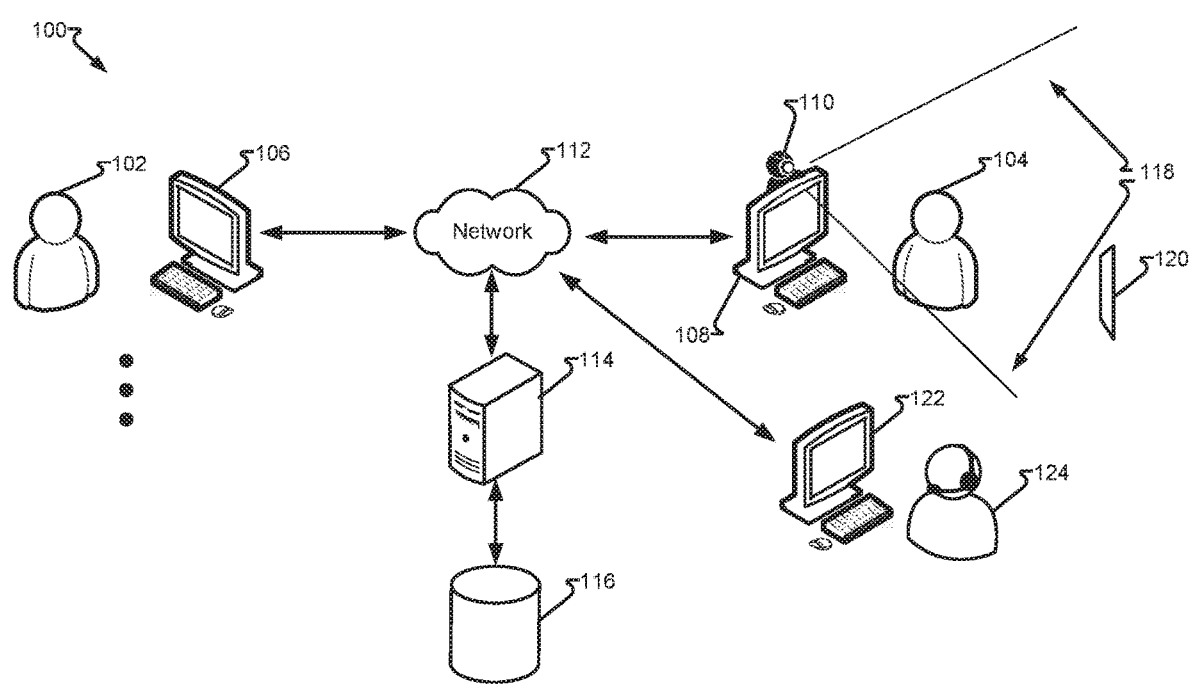
FIG. 1 depicts a first system in accordance with embodiments of the present disclosure.

FIG. 1 depicts system 100 in accordance with embodiments of the present disclosure. In one embodiment, viewing participant 102 and user 104 are participating in a video conference utilizing communication device 106 and conference communication device 108, respectively. Currently, user 104 is providing video from camera 110 to the conference via network 112 for presentation by communication device 106 and viewing by viewing participant 102. It should be appreciated that additional viewing participants, utilizing additional communication devices, may also be participating in in the conference which comprises video and optionally other forms of communication, such as sound (e.g., voice), document sharing, text, etc.

System 100 may utilize server 114 having one or more microprocessor or, more simply, "processor." Server 114 may also comprise or access data maintained in a non-transitory data storage, such as memory and/or data storage 116. Server 114 may facilitate the conference, such as to receive conference content (e.g., video) from conference communication device 108 and broadcast the conference content to communication device 106 and/or other participating devices. Server 114 and/or data storage 116 may be integrated into an endpoint, such as conference communication device 108 or communication device 106.

In another embodiment, user 104 is currently providing video content into the video conference (or, more simply, "conference") from camera 110. Camera 110 has a fixed or adjustable field of view 118 and will capture images of objects with field of view 118. This may include intended objects (e.g., user 104) and private information 120. Other objects may be neutral, in that they are not explicitly intended to be included in the video image (e.g., blank wall, tabletop, pen, pencil, blank paper, etc.) but are of no consequence if they are included and, therefore, may be considered intended objects.

In contrast, private information 120 is considered, such as by user 104, to be confidential or private or otherwise not for viewing by viewing participant 102. If user 104 remembers, and is able, private information 120 may be removed from field of view 118. However, as will be described more completely with respect to the embodiments herein, private information 120 may remain within field of view 118 and be automatically excluded from the video image presented to communication device 106. More specifically, a processor, such as a processor of conference communication device 108 and/or server 114, automatically and without human input (after an optional initial configuration) obtains an unprocessed image from camera 110, detects objects (one object being an image of private information 120), identifies the image of private information 120 as private and, in response, alters the video from camera 110 so that the image of private information 120 is excluded from the video image presented to communication device 106 for viewing by viewing participant 102.

What is considered private information can be subjective between users and the audience or purpose associated with a particular conference. In one embodiment, any object (or image of such an object) that user 104 does not want to be visible to viewing participant 102 while viewing the conference on communication device 106, is private. Profiles are provided to enable user 104 to define categories of objects, object rules, and/or object attributes that are considered private for a particular audience comprising viewing participant 102. For example, if viewing participant 102 is a work associate then user 104 may want to exclude any object (including objects with certain aspects) that may be perceived as unprofessional, such as poor grooming, sloppy clothing, or books, artwork, or other objects that are considered unprofessional. This may also include professional objects, but for a different relationship. For example, viewing participant 102 may be a representative of a particular air conditioner manufacturer and private information 120 may be a competitor company's air conditioner. Profiles may be created for any group or individual for which user 104 conducts video conferences, such as work, friends, and family. Groups may be nested, such as for particular work teams or clients, specific friends, specific family members, etc. and provide additional, or overriding, settings for what is, or is not, private.

In another embodiment, machine learning may be utilized to determine what is private and, as discussed more completely with respect to embodiments that follow, how the image of private information is removed from the video image. For example, for one or a plurality of users, an initial configuration may be provided wherein the one or more users seed the machine learning algorithm with baseline objects. If a critical threshold is reached, such as significant percentage or a majority indicate that objects that are identified as "laundry" or "books on finding a new job" and are further identified as private for business video conferences, then a machine learning algorithm may detect an object (e.g., socks, the title of a book related to finding a new job, etc.) then that object can be determined by the machine learning algorithm to be private and subsequently excluded from a video image of a conference associated with work.

Additionally or alternatively, objects may be explicitly identified and, when identified as private, extrapolated to identify other, similar objects. For example, when conducting a video conference utilizing the profile of "family" user 104 may identify objects disfavored by relatives (e.g., "junk" food, tobacco, alcohol, certain hobbies, music tastes, or other interests), such as to mark a pack of cigarettes as private. The machine learning may do word "cloud" or other search, locally or remotely, such as via accessible library, to identify objects associated with the object identified as private (e.g., the pack of cigarettes) and, as a result, identify related objects, such as an object identified as an "ashtray" and determine a sufficiently close association with the pack of cigarettes and automatically exclude the image of the ashtray from the video image. As a result, user 104 may conduct a "family" conference without providing any visual cues that indicate they still smoke.

In another embodiment, the filtering provided by one machine may be applied to the video image of another. For example, supervisor 124 may be receiving video on supervisor communication device 122, which may or may not contribute content to the conference. The image provided by camera 110 may be received by supervisor communication device 122 and, executing instructions by a processor within, apply the filtering to the raw image received by camera 110 before being presented to communication device 106. In a further embodiment, supervisor 124 may be able to manually apply and/or override the automatic blocking of private images captured by camera 110. Accordingly, filtering of private objects may be performed by the device utilized for the conference (e.g., conference communication device 108) and/or a different device, such as supervisor communication device 122.

Figure 2:
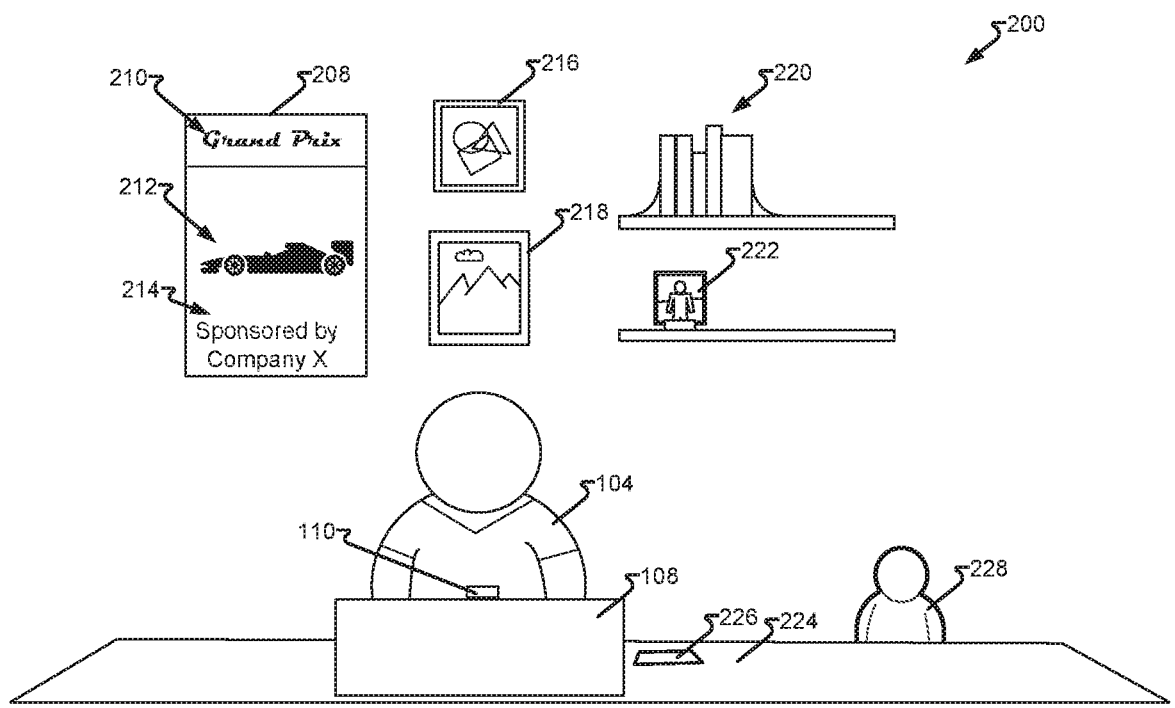
FIG. 2 depicts a video conferencing environment in accordance with embodiments of the present disclosure.

FIG. 2 depicts a video conferencing environment 200 in accordance with embodiments of the present disclosure. In one embodiment, environment 200 comprises objects within field of view 118 of camera 110, as well as camera 110 itself and conference communication device 108. Objects within environment 200 and within field of view 118 may include (all or a portion of) poster 208, poster title 210, poster graphics 212, poster text 214, artwork 216, artwork 218, books 220, photograph 222, desktop 224 (here, "desktop" 224 refers to the physical surface of a desk or table and not to an electronic desktop presented on a display by a computer), document 226, and/or user 104.

In one embodiment, a processor, such as a processor of conference communication device 108 and/or server 114 (not shown, see FIG. 1), identifies objects within field of view 118. This inventory of objects is then analyzed to determine which objects are considered private and, in response, excluded from being provided within a video image provided to conference participants, such as viewing participant 102.

In another embodiment, a portion of an object image may be considered private. For example, poster 208 may be visible within field of view 118 of camera 110, currently or in anticipation of a conference with work associates, such as a particular customer. The customer may be a competitor of "Company X" displayed within poster text 214 and, for such conferences, identified as private. In one option, what is considered private is the text itself of poster text 214. As another option, additional content may be considered private as being sufficiently associated with the private visual. For example, poster text 214 ("Company X") was well known to be associated with auto racing, presented as poster graphics 212, and/or poster title 210, then the entirety of poster 208 may be considered private. The specific metes and bounds of an object that is considered private may be explicitly determined, such as by a configuration setting determined by user 104. Additionally or alternatively, what is considered private may be determined by the AI, such as to do a search on the private information (e.g., "Company X") and if the results revealed that the private information is associated with other information (e.g., poster graphic 212, poster title 210), such that auto racing is closely associated with "Company X" and including any visual of auto racing would sufficiently suggest "Company X", then the additional visuals (e.g., poster graphic 212, poster title 210) may be considered private. If no non-private visuals remain, after all the sub-elements (e.g., poster graphic 212, poster title 210) have been identified, within the metes and bounds of poster 208, then the entirety of poster 208 may be identified as private.

As discussed above with respect to FIG. 1, what is considered private may depend on a particular audience or other participant, such as viewing participant 102, of the conference. This may be set specifically, such as when viewing participant 102 includes any one or more of "Alice, Bob, or Charlie" then utilize a particular profile associated with those viewing participant 102, such as "work."). Accordingly, various objects may be considered private for a particular viewing participant(s) 102. For example, family member 228 may be within enter field of view 118 of camera 110 and, if the conference is associated with "family" profile, is not considered to be private and therefore not removed from the video. However, if family member 228 is seen by camera 110 during a conference associated with "work" profile, then the image of family member 228 may be identified as private and excluded from the video.

Figure 3:
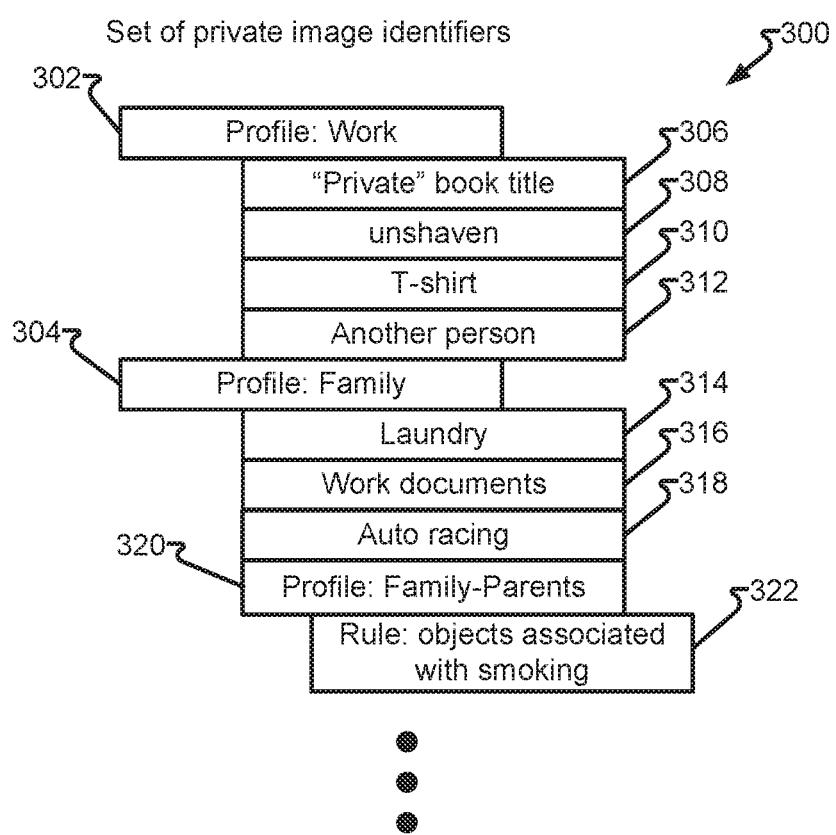
FIG. 3 depicts a first data structure in accordance with embodiments of the present disclosure.

FIG. 3 depicts data structure 300 in accordance with embodiments of the present disclosure. In one embodiment, data structure 300 is maintained in a non-transitory data storage, such as data storage 116 and/or memory or other storage device of conference communication device 108 to identify objects or object types identified as private. The identification of private objects may be dependent on a particular profile or profiles.

Figure 4:
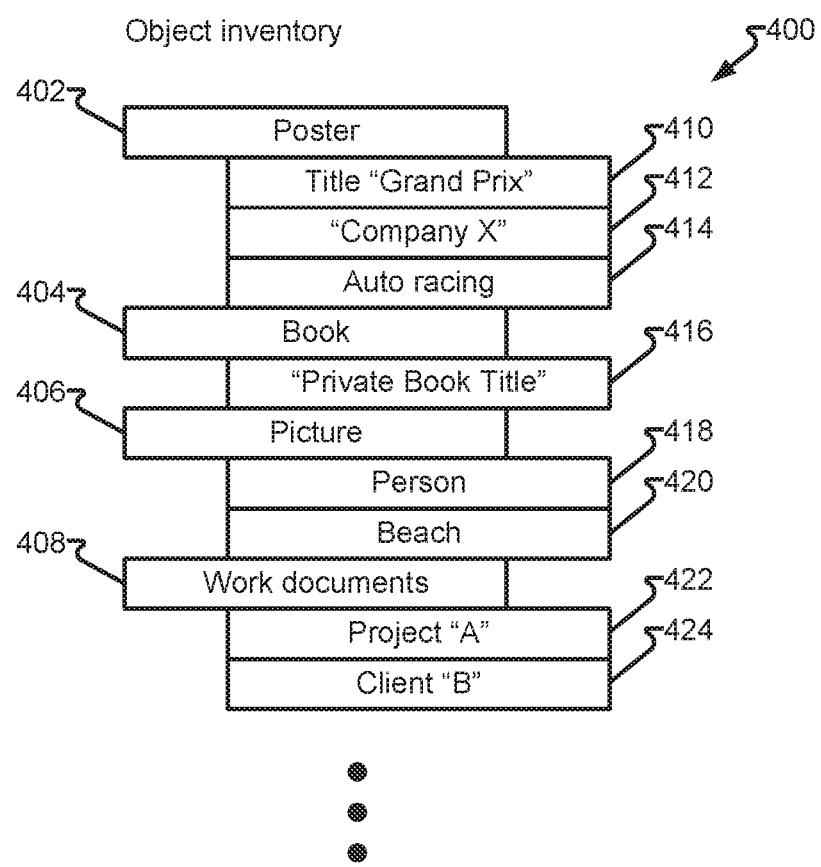
FIG. 4 depicts a second data structure in accordance with embodiments of the present disclosure.

In one embodiment, work profile 302 identifies visuals 306, 308, 310, and 312; family profile 304 identifies visuals 314, 316, and 318, and family-parents sub-profile 320 identifies visual 322. While only identified objects may be identified, such as a list of book titles identified in visuals 306, the identified objects may be extrapolated programmatically. For example, a particular book title may not be explicitly identified in visuals 306, but have a common theme and, as a result, a similar book title may be identified as private. Additionally or alternatively, visual 322 may describe a rule or instructions by which an object is identified as private, for example, visual 322 may define a rule or instructions to cause a processor execute the rule or instruction to then identify all objects defined by the rule, within field of view 118 of camera 110. FIG. 4 depicts data structure 400 in accordance with embodiments of the present disclosure. In one embodiment, a processor, such as a processor of conference communication device 108 and/or server 114, identifies objects within field of view 118, maintains data structure 400 in an non-transitory data storage, such as data storage 116 and/or a memory of one or both of conference communication device 108 and/or server 114. Data structure 400 may comprise, in whole or in part, an inventory of objects detected within field of view 118. For example, image of objects 402, 404, 406, 408 and discrete object portions 410, 412, 414, 416, 418, 420, 422, and 424.

In another embodiment, the aforementioned processor may compare elements of data structure 400 with the visuals maintained in data structure 300. Upon determining a match, with a particular data structure element thereof, the associated visual is identified (e.g., an indicator in a data structure (not shown) set to indicate the visual indicators, or portion thereof, is private.

Figure 5:
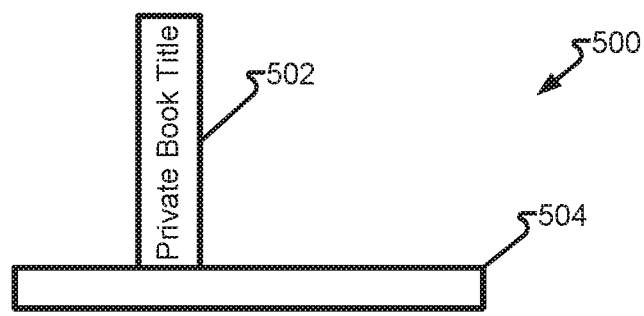
FIG. 5 depicts a private image portion of a video conferencing image in accordance with embodiments of the present disclosure.

FIG. 5 depicts private image portion 500 of a video conferencing image in accordance with embodiments of the present disclosure. In one embodiment, private image portion 500 comprises a portion of environment 200, in particular book 502 of books 202 (see FIG. 2). Book 502 may have a title that is identified in an entry of data structure 300, such as visual 306, as private. When the image captured by camera 110 is analyzed and book 502 is determined to be present, an entry may be made or updated to indicate the presence of book 502, such as object 404 and/or object portion 416 (see FIG. 4). As a result, the private image (e.g., image of book 502) is excluded, such as by means described more completely with respect to FIGS. 6A-D and FIG. 7 and the processes of FIGS. 8 and 9.

FIG. 6A-D depicts a processed private image portions 600 of a video conferencing image in accordance with embodiments of the present disclosure. When an object, more specifically, the image of an object, is to be excluded from a video image, one or more methodologies may be implemented by a processor, such as a processor of conference communication device 108 and/or server 114. In one embodiment, illustrated by FIG. 6A, processed image portion 600, illustrates the title of book 502 on shelf 504 provided with overlay 602, such as a blur, pixilation, or other alteration to cause the text visible on the spine of book 502 to become illegible. In another embodiment, illustrated by FIG. 6B, processed image portion 610, illustrates the title of book 502 on shelf 504 provided with overlay 612, to replace the actual title of book 502 with a replacement title and wherein the original title is no longer visible. In another embodiment, illustrated by FIG. 6C, processed image portion 620, illustrates the title of book 502 on shelf 504 provided with overlay 622, such as a texture, block, or other overlay to substantially overlay the metes and bounds of book 502 with a significantly opaque mask wherein book 502 becomes obscured. In another embodiment, illustrated by FIG. 6D, processed image portion 630, illustrates the title of book 502 on shelf 504 provided with overlay 632, such as a replacement object that obscures the book 502 and optionally extends beyond the metes and bounds of book 502. The degree of the extension may be a certain ratio or percentage (e.g., no more than twice the size of the object, or otherwise delimited).

In another embodiment, private information may have certain overriding settings. For example, if user 104 were to stand or leave field of view 118, the entire video image may be obscured, such as by providing a static or alternative video image, placeholder text, or blank image. Once user 104 returns, the video may be resumed as before. Similarly, and in another embodiment, the entire image may be blanked (e.g., video feed stopped, static image provided in place of the video feed, etc.) if piecemeal overlaying of private object images is unable to successfully remove the private object images and leave a usable portion of the video (e.g., the presenter). User 104 may be prompted, such as to address the content in the video image or to override such a determination and provide the video image as it is, certain portions, or with the piecemeal overlays. For example, user 104 may draw a box or other shape on a display showing the video feed on conference communication device 108, such as of themselves, and allow only the video within the shape to be provided as video content to communication device 106.

Figure 6A:
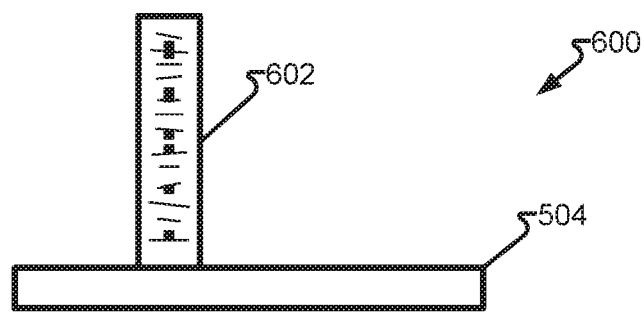
FIG. 6A-D depicts a processed private image portion of a video conferencing image in accordance with embodiments of the present disclosure.
Figure 6B:
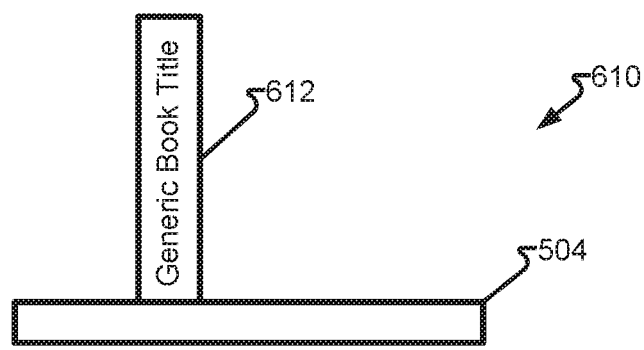
Figure 6C:
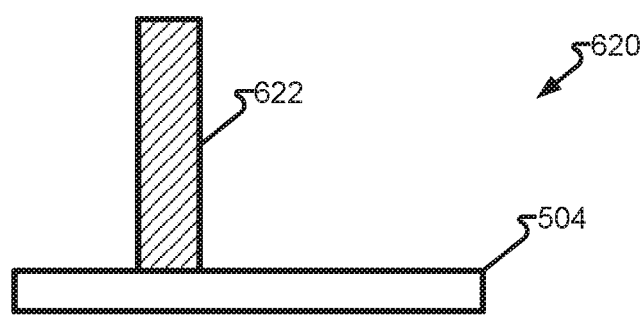
Figure 6D:
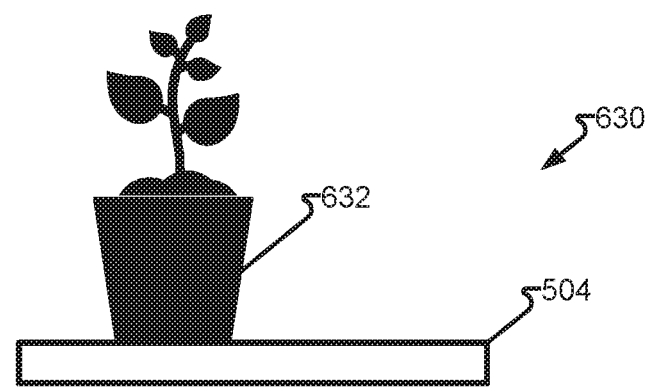

As a further option, and as an extension of the embodiment described with respect to FIG. 6D, the choice of a replacement object to obscure a private object is variously embodied. This may include neutral objects, such as a houseplant, or specific images. For example, if during a prior communication with user 104, it is determined that a customer asked about intellectual property, an image of a patent plaque may be identified, such as from data storage 116, and inserted as overlay 632.

Figure 7:
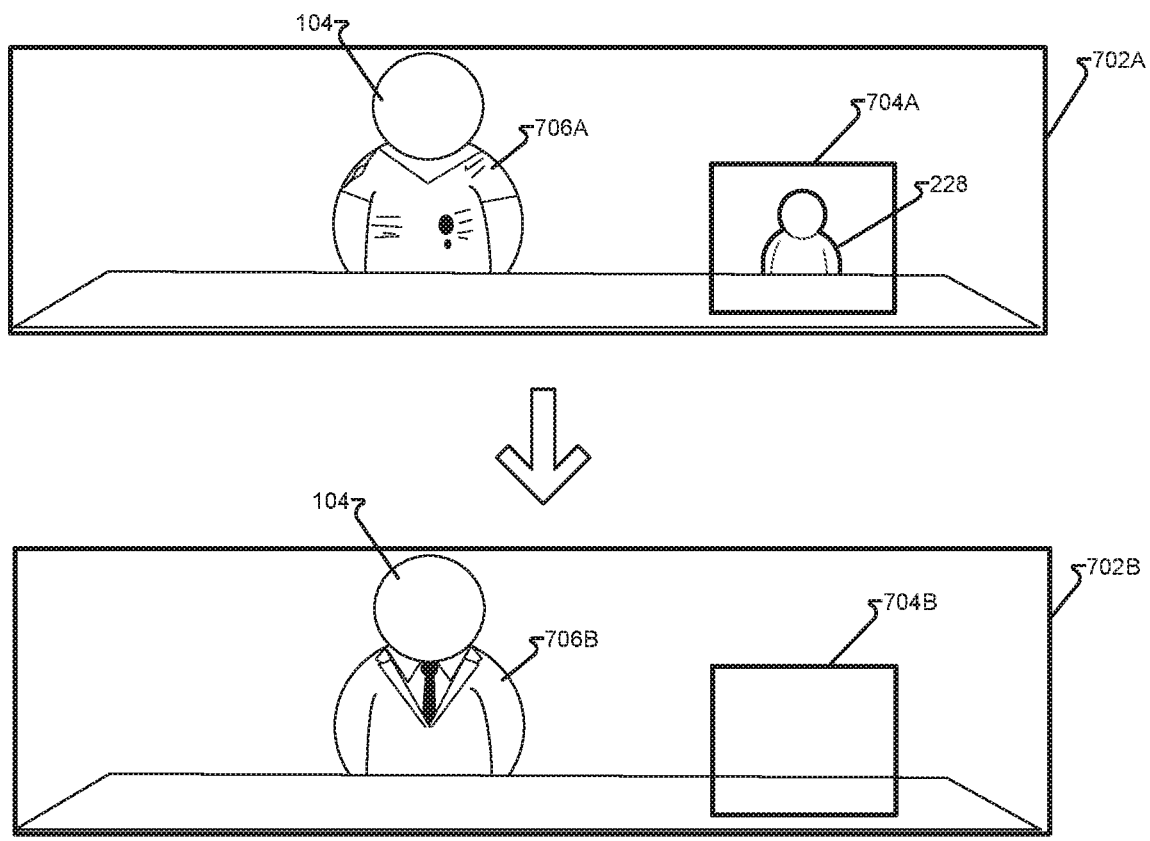
FIG. 7 depicts processed video conferencing image from an unprocessed video conference image in accordance with embodiments of the present disclosure.

FIG. 7 depicts processed video conferencing image 702B from an unprocessed video conference image 702A in accordance with embodiments of the present disclosure. Unprocessed video image 702A comprises visuals that have been identified as private for a particular video conference. For example, user 104 may be wearing shirt 706A, identified, such as by a processor of conference communication device 108 and/or server 114, as "t-shirt", or other attribute (e.g., green, torn, stained, wrinkled, etc.). Upon determine a match to an entry, such as in data structure 300, (e.g., visual 310) that a t-shirt is private for business conferences based on the currently selected profile. Other elements (e.g., torn, stained, wrinkled, etc.) may be private for business and/or other profiles. Other elements (e.g., "green") may have no entry and, by itself, not cause the associated visual to be identified as private.

Unprocessed video image 702A may also comprise visual 704A of other family member 228. While this may not be considered private for certain conference (e.g., conferences having a profile of "family") it may be considered private for other conferences (e.g., conferences having a profile of "work"). In another embodiment, a signal may be sent to camera 110 to narrow field of view 118 to exclude the image of other family member 228.

In another embodiment, the aforementioned processor processes video image 702A into processed video image 702B wherein private visuals are excluded. For example, shirt 706A may be overlaid with visual 706B, such as a suit, clean, pressed shirt, or other object of clothing not associated with privacy. Similarly, user 104 may have an overlay, such as to show their eyes as more alert, when sleepy, their face shaven, when having stubble, or other features in order to remove private aspects of the unprocessed image. This may include mapping image portions to conform to a texture or geometry of an object. For example, the pattern on an article of clothing will appear farther apart when viewed at a right angle (e.g., chest portion of the wearer) as compared to a more oblique angle (e.g., top of the shoulder or sides of the wearer), as well as have different lighting attributes applied to select surfaces to provide a more realistic appearance.

In another embodiment visual 704B replaces visual 704A, such when a visual family member 228 is captured therein. In addition to any one or more of the foregoing treatments that may be applied, visual 704B may comprise a portion of a prior frame or frames captured by camera 110 when family member 228 was not present and overlaid or replacing visual 704A.

Figure 8:
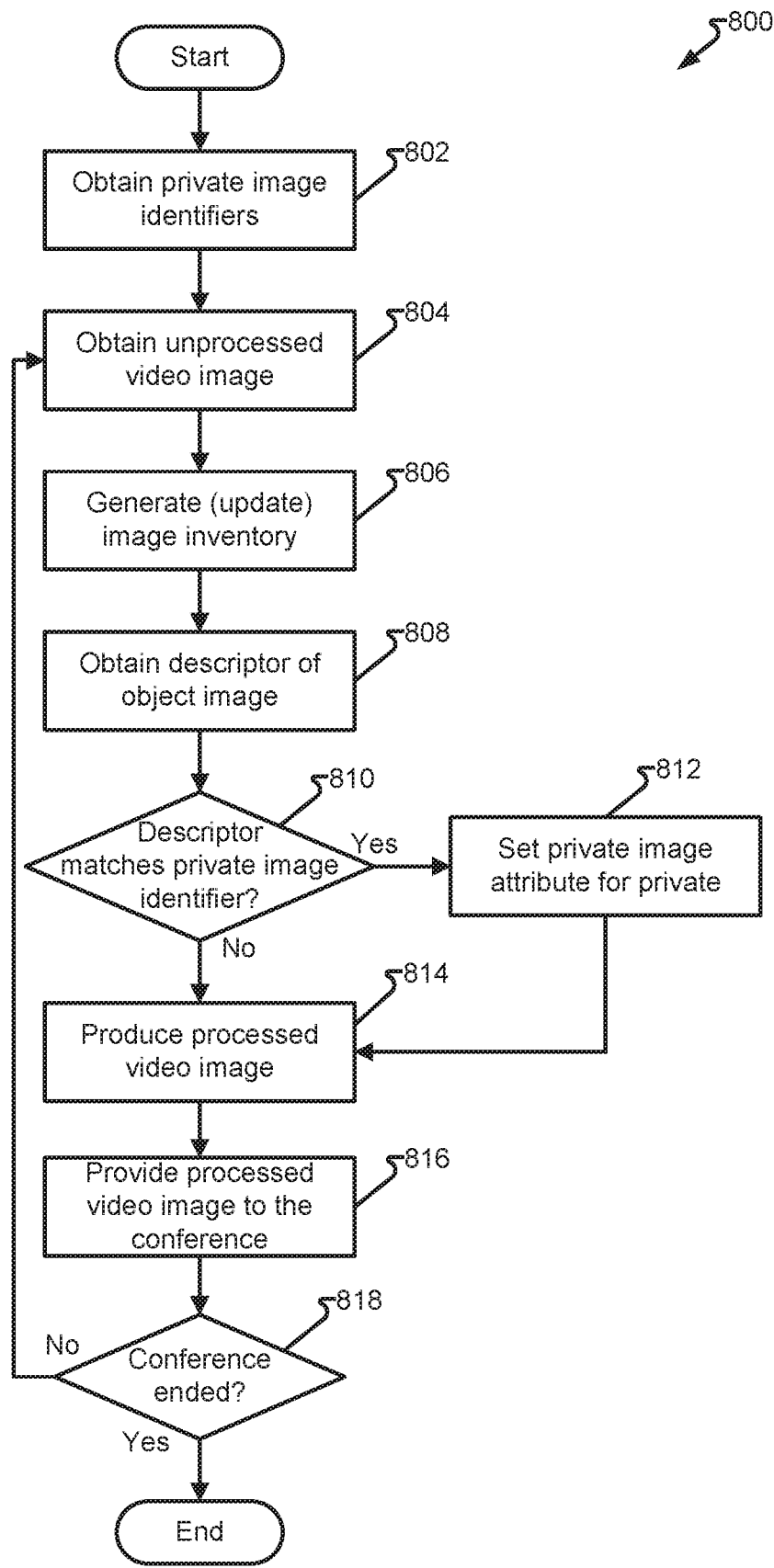
FIG. 8 depicts a first process in accordance with embodiments of the present disclosure.

FIG. 8 depicts process 800 in accordance with embodiments of the present disclosure. Process 800 may be embodied as machine-executable instructions to cause a processor to perform the steps therein. In one embodiment process 800 is initiated to remove private visuals from a video conferencing image. Process 800 begins and, in step 802, obtains private image identifiers, such as those described with respect to data structure 300 identifying objects and/or attributes of the objects (e.g., condition, position, defects, etc.). In step 804 video is obtained, such as from camera 110 capturing images of objects within its field of view.

In step 805, an image inventory is created (or updated) to identify objects and/or attributes of the object. Next, step 808 obtains descriptors for the object, such as from an online library or local data structure that describe the object. Test 810 determines if any one or more descriptors describe a private image identifier, obtained in step 802. If determined in the affirmative, step 812 identifies the object image as private and processing continues to step 814. If test 810 is determined in the negative, process 800 may continue to step 814 wherein processing is a null operation (e.g., provide raw video obtained in step 804 when no object is identified as private). However, following step 812, step 814 processes the video obtained in step 804 and produces a processed video absent images of private objects. Step 814 may overlay a different image, "remove" the object's image by replacing a portion of the frame, currently having the image of the object, with a prior portion of a different frame wherein the private object was absent.

Figure 9:
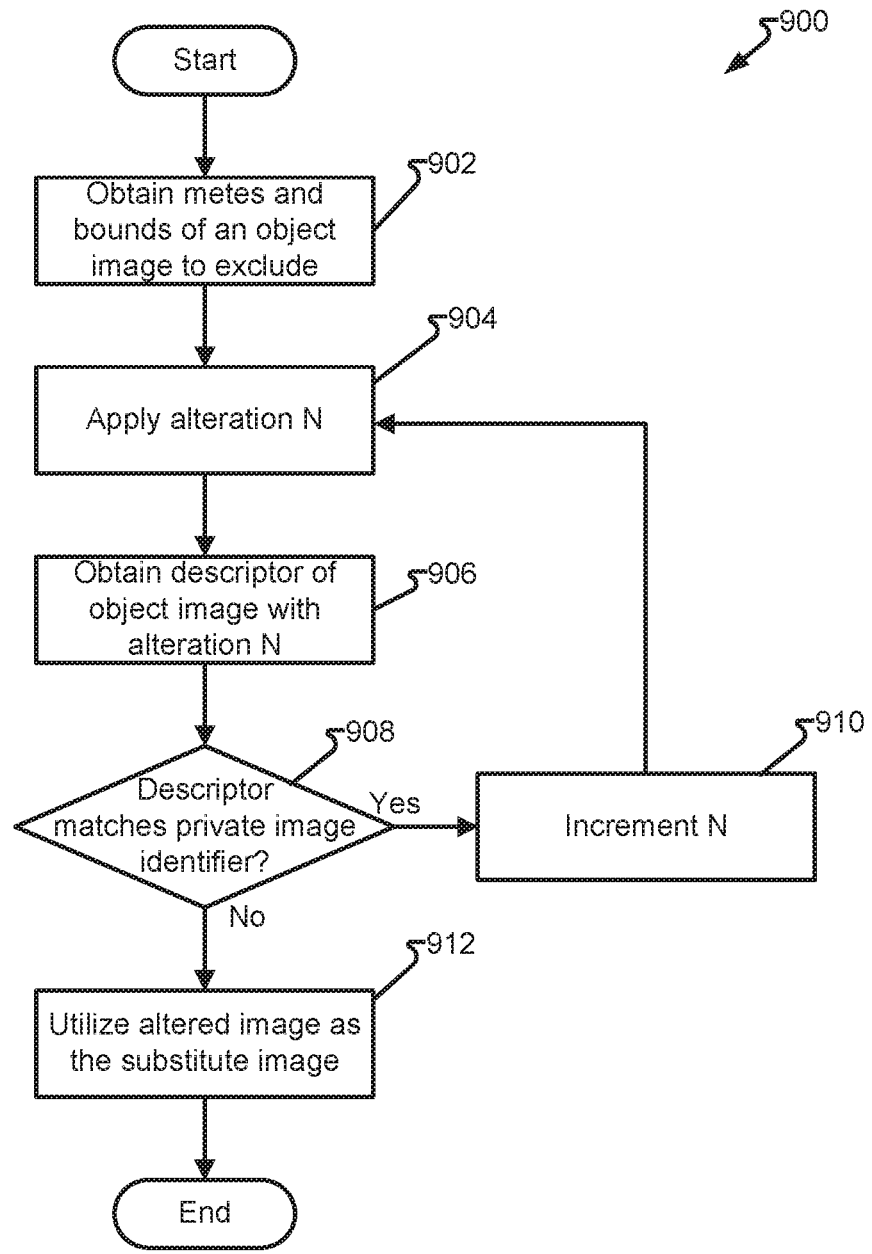
FIG. 9 depicts a second process in accordance with embodiments of the present disclosure.

Step 814 may be iterative, which is described in more detail with respect to process 900 (see, FIG. 9). With the video processed to remove private information, step 816 provides the processed video as an input into the conference. If test 818 determines the conference is ended, process 800 may end, otherwise some or all of process 800 may be performed iteratively, such as to obtain a new image, in step 804, and proceed through steps 802-816 again to provide a processed video that may have a new object (e.g., a family member) enter into the field of view of the camera and/or to reverify that no object is incorrectly identified as private or non-private (such as when the lighting in a room changes and objects become more or less visible and are reprocessed as an updated object starting with step 806.

As a further option, such as the processing of the video image causes an associated audio to be out of sync, the audio may be buffered so as to provide the video image synchronized with the audio to communication device 106. Utilization of sufficient computational power (e.g., quantum computing) may maintain synchronization of the audio with the video, as processed via the embodiments provided herein and alleviate the need for resynchronization of the audio with the video portions.

FIG. 9 depicts process 900 in accordance with embodiments of the present disclosure. Process 900 may be embodied as machine-executable instructions to cause a processor to perform the steps therein. Process 900 dynamically processes an image to determine if the processed image comprises private information and, if not, iteratively re-processes the image until the private information is no longer present. Process 900 begins and step 902 obtains the metes and bounds of an object to exclude. For example, edge detection is a common means by which an outline of an object is made from a photographic image, such as a video image received from camera 110. This may be the entirety of an object (e.g., poster 208) or a portion, such as poster graphic 212 and/or poster text 214, or the title portion of book 502.

In step 904 a first alteration, or degree of an alteration is applied to the metes and bounds of the image. In step 906 a new descriptor(s) is obtained from the processed image and evaluated in test 908. If test 908 determines that the processed image, via the descriptors obtained in step 906, no longer match private information, processing continues to step 912 and the video, as processed, is provided into the conference.

If test 908 is determined in the affirmative, and the image as modified comprises private image identifiers, then processing continues to step 910 wherein the level of alteration is incremented and processing then loops back to step 904 wherein the incremented level of alteration is applied. In one embodiment, the alteration is incremented so that more of an alteration is provided (e.g., a first degree of blurring and, if unsuccessfully obscuring the image to remove descriptors matching private information, applying a second degree of blurring, etc.). In another embodiment, different alterations are applied. For example, the image of the private object may be blurred in one iteration and, if unsuccessful (e.g., test 908 is determined in the affirmative), then a different obscuration is provided, such as applying a shading. This may continue through some or all of the types of image obscuration available (e.g., blurring, coloring, darkening, altering contrast, etc.). If still unsuccessful, the image may be overlaid with an opaque image, such as described with respect to FIGS. 6B-D.

Figure 10:
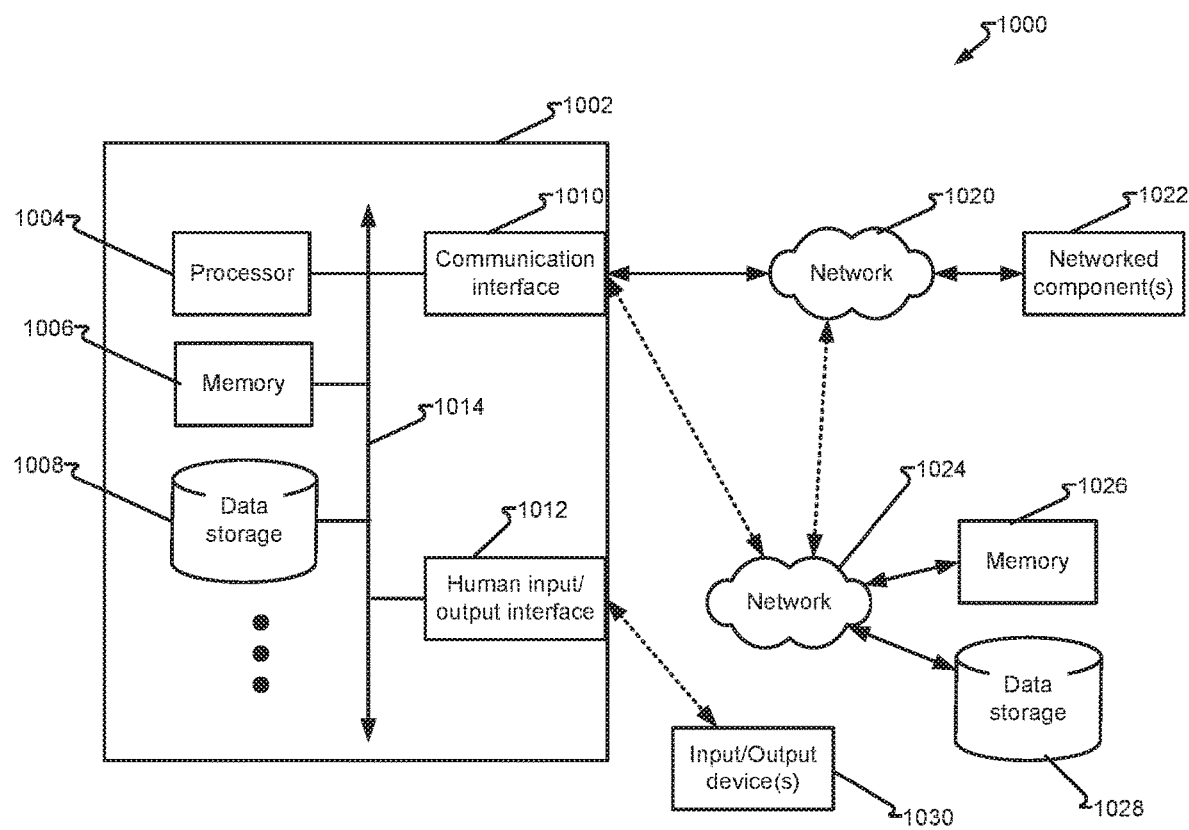
FIG. 10 depicts a second system in accordance with embodiments of the present disclosure.

FIG. 10 depicts system 1000 in accordance with embodiments of the present disclosure. In one embodiment, conference communication device 108 and/or server 114 (see FIG. 1) may be embodied, in whole or in part, as device 1002 comprising various components and connections to other components and/or systems. The components are variously embodied and may comprise processor 1004. Processor 1004 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via bus 1014, executes instructions, and outputs data, again such as via bus 1014. In other embodiments, processor 1004 may comprise a shared processing device that may be utilized by other processes and/or process owners, such as in a processing array or distributed processing system (e.g., "cloud", farm, etc.). It should be appreciated that processor 1004 is a non-transitory computing device (e.g., electronic machine comprising circuitry and connections to communicate with other components and devices). Processor 1004 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor (e.g., processor 1004) and the hardware and other circuitry thereof.

In addition to the components of processor 1004, device 1002 may utilize memory 1006 and/or data storage 1008 for the storage of accessible data, such as instructions, values, etc. Communication interface 1010 facilitates communication with components, such as processor 1004 via bus 1014 with components not accessible via bus 1014. Communication interface 1010 may be embodied as a network port, card, cable, or other configured hardware device. Additionally or alternatively, human input/output interface 1012 connects to one or more interface components to receive and/or present information (e.g., instructions, data, values, etc.) to and/or from a human and/or electronic device. Examples of input/output devices 1030 that may be connected to input/output interface include, but are not limited to, keyboard, mouse, trackball, printers, displays, sensor, switch, relay, etc. In another embodiment, communication interface 1010 may comprise, or be comprised by, human input/output interface 1012. Communication interface 1010 may be configured to communicate directly with a networked component or utilize one or more networks, such as network 1020 and/or network 1024.

Network 112 may be embodied, in whole or in part, as network 1020. Network 1020 may be a wired network (e.g., Ethernet), wireless (e.g., WiFi, Bluetooth, cellular, etc.) network, or combination thereof and enable device 1002 to communicate with network component(s) 1022. In other embodiments, network 1020 may be embodied, in whole or in part, as a telephony network (e.g., public switched telephone network (PSTN), private branch exchange (PBX), cellular telephony network, etc.)

Additionally or alternatively, one or more other networks may be utilized. For example, network 1024 may represent a second network, which may facilitate communication with components utilized by device 1002. For example, network 1024 may be an internal network to a business entity or other organization, whereby components are trusted (or at least more so) that networked components 1022, which may be connected to network 1020 comprising a public network (e.g., Internet) that may not be as trusted.

Components attached to network 1024 may include memory 1026, data storage 1028, input/output device(s) 1030, and/or other components that may be accessible to processor 1004. For example, memory 1026 and/or data storage 1028 may supplement or supplant memory 1006 and/or data storage 1008 entirely or for a particular task or purpose. For example, memory 1026 and/or data storage 1028 may be an external data repository (e.g., server farm, array, "cloud," etc.) and allow device 1002, and/or other devices, to access data thereon. Similarly, input/output device(s) 1030 may be accessed by processor 1004 via human input/output interface 1012 and/or via communication interface 1010 either directly, via network 1024, via network 1020 alone (not shown), or via networks 1024 and 1020. Each of memory 1006, data storage 1008, memory 1026, data storage 1028 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 1030 may be a router, switch, port, or other communication component such that a particular output of processor 1004 enables (or disables) input/output device 1030, which may be associated with network 1020 and/or network 1024, to allow (or disallow) communications between two or more nodes on network 1020 and/or network 1024. Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for automatically preventing a portion of a video image containing private information from being included in a video communication comprising:
    obtaining, by a processor, a set of private image identifiers;
    obtaining, by the processor, an unprocessed video image captured by a camera;
    generating, by the processor, an image inventory comprising at least an object image captured in the unprocessed video image;
    obtaining, by the processor, a descriptor of the object image;

upon determining the descriptor of the object image matches at least one of the set of private image identifiers, setting a private attribute associated with the object image; and generating, by the processor, a processed video image comprising a number of frames, each frame comprising a first portion, having the unprocessed video image, and a second portion within the boundaries of the first portion at the location of the object image within the first portion, and wherein the second portion excludes the object image when the private attribute is set, and providing the processed video image to a network interface for transmission, via a network, as a portion of the video communication and wherein the processor generates the processed video to exclude the object image in the second portion, further comprises, encoding the processed video with a substitute image in place of the object image and wherein the substitute image comprises the second portion associated with the location of the object image within the unprocessed video and captured during a prior frame of the unprocessed video that is absent the object image.

2. The method of claim 1, wherein the substitute image further comprises the object image as altered to make an altered object image that is absent the descriptor of the object image.

3. The method of claim 1, wherein:
the descriptor of the object image comprises a set of descriptors; and
selecting the substitute image, further comprises, selecting the substitute image from a pool of candidate substitute images, wherein each of the pool of candidate substitute images has an associated set of substitute image attributes and the selected substitute image is selected upon determining the set of substitute image attributes associated with the selected substitute image best match to the set of descriptors.

4. The method of claim 3, wherein the pool of candidate substitute images is selected from a superset of candidate substitute images to exclude any of the candidate substitute images, within the superset, having at least one of the set of substitute image attributes that matches the at least one of the set of private image identifiers.

5. The method of claim 1, wherein the substitute image is selected from a pool of candidate images having a shape substantially similar to the object image.

6. The method of claim 1, wherein the substitute image mapped onto a surface model of the object and sized to overlay the surface model.

7. The method of claim 1, wherein obtaining the private image identifiers further comprises receiving a selection for a conference profile from a plurality of conference profiles, wherein each of the plurality of conference profiles is associated with a particular type of participant in the video conference, and wherein each of the plurality of conference profiles comprise an associated set of the private image identifiers and, upon receiving the selection of the conference profile, providing the associated set of the private image identifiers.

8. The method of claim 1, wherein the processed video image is one of a blank video image, a still frame image, a placeholder image, or a null video image.

9. A system for automatically preventing a portion of a video image containing private information from being included in a video communication comprising:
a processor;
a camera;
a memory;
a network interface to a network; and
wherein the processor, coupled to the memory programmed with machine-executable instructions, cause the processor to:
obtain a set of private image identifiers;
obtain an unprocessed video image captured by the camera;
generating an image inventory comprising at least an object image captured in the unprocessed video image;
obtain a descriptor of the object image;
upon determining the descriptor of the object image matches at least one of the set of private image identifiers, set a private attribute associated with the object image; and
generate a processed video image comprising a number of frames, each frame comprising a first portion having the unprocessed video image, and a second portion within the boundaries of the first portion at the location of the object image within the first portion, and wherein the second portion excludes the object image when the private attribute is set, and providing the processed video image to the network interface for transmission, via the network, as a portion of the video communication and wherein the processor generates the processed video to exclude the object image in the second portion and encodes the processed video with a substitute image in place of the object image and wherein the processor generates the substitute image to comprise the second portion of the unprocessed video, associated with the location of the object image within the unprocessed video and captured during a prior frame of the unprocessed video that is absent the object image.

10. The system of claim 9, wherein the substitute image comprises the object image as altered to make an altered object image that is absent the descriptor of the object image.

11. The system of claim 9, wherein:
the descriptor of the object image comprises a set of descriptors; and
the processor selects the substitute image from a pool of candidate substitute images, wherein each of the pool of candidate substitute images has an associated set of substitute image attributes and the selected substitute image is selected upon being determined to have the substitute image attributes that best match to the set of descriptors.

12. The system of claim 11, wherein the processor selects the substitute image from the pool of candidate substitute images, further selected from a superset of candidate substitute images to exclude any candidate substitute images, within the superset, having at least one of the set of substitute image attributes that matches the at least one of the set of private image identifiers.

13. The system of claim 9, wherein the processor selects the substitute image from a pool of candidate images having a shape substantially similar to the object image.

14. The system of claim 9, wherein the processor maps the substitute image onto a surface model of the object and sized to overlay the surface model.

15. The system of claim 9, wherein the processor obtains the private image identifiers wherein the processor receives a selection for a conference profile from a plurality of conference profiles, wherein each of the plurality of conference profiles is associated with a particular type of participant in the video conference, and wherein each of the plurality of conference profiles comprise an associated set of the private image identifiers and, upon receiving the selection of the conference profile, providing the associated set of the private image identifiers.

16. A system for automatically preventing a portion of a video image containing private information from being included in a video communication comprising:
   means to obtain a set of private image identifiers;
   means to obtain an unprocessed video image captured by the camera;
   means to generating an image inventory comprising at least an object image captured in the unprocessed video image;
   means to obtain a descriptor of the object image;
   upon determining the descriptor of the object image matches at least one of the set of private image identifiers, means to set a private attribute associated with the object image; and
   means to generate a processed video image comprising a number of frames, each frame comprising a first portion having the unprocessed video image, and a second portion within the boundaries of the first portion at the location of the object image within the first portion, and wherein the second portion excludes the object image when the private attribute is set, and providing the processed video image to the network interface for transmission, via the network, as a portion of the video communication and wherein the means to generate the processed video to exclude the object image in the second portion, further comprises, means to encode the processed video with a substitute image in place of the object image and means to generate the substitute image to comprise the second portion of the unprocessed video, associated with the location of the object image within the unprocessed video and captured during a prior frame of the unprocessed video that is absent the object image.

17. The system of claim 16, wherein the substitute image further comprises the object image as altered to make an altered object image that is absent the descriptor of the object image.

18. The system of claim 16, further comprising:
   wherein the descriptor of the object image comprises a set of descriptors; and
   means to select the substitute image from a pool of candidate substitute images, wherein each of the pool of candidate substitute images has an associated set of substitute image attributes and the selected substitute image is selected upon determining the set of substitute image attributes associated with the selected substitute image best match to the set of descriptors.

19. The system of claim 18, further comprising means to select the pool of candidate substitute images from a superset of candidate substitute images to exclude any of the candidate substitute images, within the superset, having at least one of the set of substitute image attributes that matches the at least one of the set of private image identifiers.

20. The system of claim 16, wherein the means to select the substitute image further comprises means to select the substitute image from a pool of candidate images having a shape substantially similar to the object image.

* * * * *

UNITED STATES PATENT AND TRADEMARK OFFICE
CERTIFICATE OF CORRECTION

PATENT NO. : 11,303,848 B2
APPLICATION NO. : 16/894226
DATED : April 12, 2022
INVENTOR(S) : Valentine C. Matula et al.

It is certified that error appears in the above-identified patent and that said Letters Patent is hereby corrected as shown below:

In the Claims

At Column 20, Line 64, after "at least an object image" insert --of an object-- therein.
At Column 21, Line 1, after "upon determining" insert --that-- therein.
At Column 21, Line 8, after "a second portion within" please delete "the" therein.
At Column 21, Line 9, after "portion at" delete "the" and insert --a-- therein.
At Column 21, Line 16, please delete "comprises" and insert --comprising-- therein.
At Column 21, Line 20, after "video" insert --image-- therein.
At Column 21, Line 22, after "video" insert --image-- therein.
At Column 21, Line 50, after "obtaining the" insert --set of-- therein.
At Column 21, Line 55, please delete the first occurrence of "conference" and insert --communication-- therein.
At Column 22, Line 3, after "processor" delete "," and insert --is-- therein.
At Column 22, Line 4, after "instructions" insert --that-- therein.
At Column 22, Line 7, after "video image" insert --of an object-- therein.
At Column 22, Line 8, please delete "generating" and insert --generate-- therein.
At Column 22, Line 11, after "upon determining" insert --that-- therein.
At Column 22, Line 18, after "within" please delete "the" therein.
At Column 22, Line 18, after "the first portion at" please delete "the" and insert --a-- therein.
At Column 22, Line 29, after "video" insert --image-- therein.
At Column 22, Line 30, after "video" insert --image-- therein.
At Column 22, Line 42, after "to have the" insert --associated set of-- therein.
At Column 22, Line 62, after the first occurrence of "the" insert --set of-- therein.
At Column 22, Line 66, please delete "conference" and insert --communication-- therein.
At Column 23, Line 9, please delete "the" and insert --a-- therein.
At Column 23, Line 10, please delete "generating" and insert --generate-- therein.
At Column 23, Line 11, after "an object image" insert --of an object-- therein.
At Column 23, Line 21, after "portion within" please delete "the" therein.
At Column 23, Line 21, after "first portion at" please delete "the" and insert --a-- therein.
At Column 23, Line 25, after "image to" please delete "the" and insert --a-- therein.

Signed and Sealed this
Eighteenth Day of October, 2022

Katherine Kelly Vidal
*Director of the United States Patent and Trademark Office*

CERTIFICATE OF CORRECTION (continued)
U.S. Pat. No. 11,303,848 B2

At Column 23, Line 26, after "transmission, via" delete "the" and insert --a-- therein.
At Column 23, Line 28, after "processed video" insert --image-- therein.
At Column 23, Line 30, after "processed video" insert --image-- therein.
At Column 24, Line 2, after "video" insert --image-- therein.
At Column 24, Line 3, after "unprocessed video" insert --image-- therein.
At Column 24, Line 4, after "unprocessed video" insert --image-- therein.